June 25, 1929.　　J. REECE ET AL　　1,718,579
POWER TRANSMISSION
Filed Dec. 22, 1925　　4 Sheets-Sheet 2

Inventors
John Reece
Franklin A. Reece
BY Rogers, Kennedy & Campbell,
ATTORNEYS.

June 25, 1929.  J. REECE ET AL  1,718,579
POWER TRANSMISSION
Filed Dec. 22, 1925  4 Sheets-Sheet 3

Fig.4.

Inventors
John Reece
Franklin A. Reece
by Rogers, Kennedy & Campbell,
Attys.

June 25, 1929.   J. REECE ET AL   1,718,579
POWER TRANSMISSION
Filed Dec. 22, 1925    4 Sheets-Sheet 4

Inventors.
John Reece
Franklin A. Reece
by Rogers, Kennedy & Campbell,
Attys.

Patented June 25, 1929.

1,718,579

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed December 22, 1925. Serial No. 77,124.

This invention relates to power transmission, and involves apparatus adapted to be used in various situations and for various purposes where varying speeds of transmission are required, for example as a part of the power transmission apparatus of motor vehicles, especially those in which the source of power is an internal combustion engine.

The general object of the invention is to afford more effective and convenient power transmission for the purposes mentioned, and more particularly to provide a mechanism wherein the speed ratio and delivered torque are self adjusting to the conditions of load or resistance; and whereby the prevailing clutch and change speed gears used on motor vehicles are dispensed with. An instance of transmission apparatus of this class is shown in our prior Patent, Number 1,551,692 of September 1, 1925. In this prior apparatus a revolving support, turned by the power of the driving shaft, carries around with it a mass thrusting device or carrier, e. g. planetating, and one or more centrifugal masses loose or separate from the device, these by reason of their revolution about the main axis becoming endowed with centrifugal force, while the device operates to take each mass at an outward position and convey or thrust it bodily inwardly and release or discharge it at an inward position, from which it may return outwardly in an independent path for repetition of action; the thrusting device or carrier being actuated by connections from the driven shaft, and therefore at a rate corresponding with the difference in speeds of the driving and driven shafts; so that the centrifugal force of the masses operating as a thrusting pressure is transmitted as a self adjusting one-direction torque to the driven shaft. Specifically Patent 1,551,692 shows a device or planetating carrier operating upon one or more masses each moving around or guided in an annular path or channel, with a vane or thrusting means forcing the mass inwardly and resulting in one-direction transmission. The described prior transmission has the advantage that all of the thrusts delivered by the centrifugal masses are in one direction only, and each of these thrusts occupies a comparatively extended portion of each cycle of action, although the return or outward movement of each mass is apt to develop heat without special provision for utilizing the movement. Another prior type of transmission employing centrifugal masses, is our prior Patent Number 1,461,557 of July 10, 1923, in which the centrifugal masses are not loose or free and can not be discharged or released from their actuating devices, but on the contrary are attached, and therefore in active connection with the driving or driven parts in every phase of action or motion, with the result that on the return or outward movement of each mass its centrifugal force would have a tendency to thrust in the wrong direction or reversely on the driven parts, and would cancel the driving effect produced during the other phase, except for the interposition of a one-way device or pawl and ratchet, with usually a transmitting spring between these parts and the eventual driven shaft. A distinct advantage lies in this type of apparatus in the conservation of energy by reason of the fact that no power is drawn from the driving parts in whirling the masses, except when the driven shaft is turning, and then in proportion to the work done. A particular object of the present invention is to afford an apparatus which maintains and combines the several advantages of the two prior types of transmission referred to.

Another object of the present invention is to provide an effective reversing mechanism adapted by simple manipulation to reverse the direction of rotation of the driven shaft and drive it at low speed and without permitting a release of the intermediate parts and propeller spring during the transition, which would result in a snapping action of the spring and a blow or possible breakage.

Other and further objects and advantages of the present invention will be elucidated in the hereinafter following description of an illustrative embodiment thereof, or will be apparent to those skilled in the subject. To the attainment of the objects and advantages referred to the present invention consists in the novel power transmission apparatus and the novel features of combination, arrangement, operation, mechanism and detail herein illustrated or described.

In the accompanying drawings Fig. 1 is a central sectional view taken on two different radii, the upper part of the figure taken on the radius 1ª of Fig. 4, looking upwardly, and the lower half of Fig. 1 taken on the radius 1ᵇ, looking from the left. The words left, right, rear and front will be used herein with respect to the use of the apparatus in a motor vehicle.

Fig. 4 is a transverse section taken on the line 4—4 of Fig. 1, looking from the rear.

Figure 1:
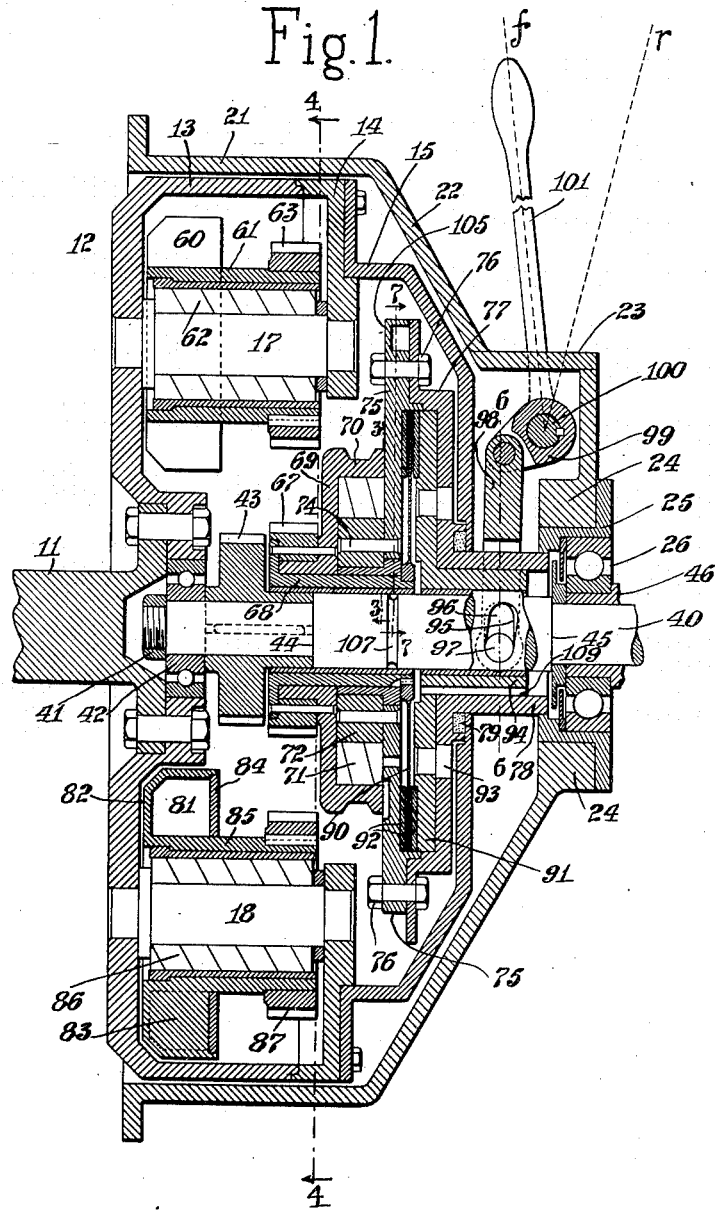
Figure 5:
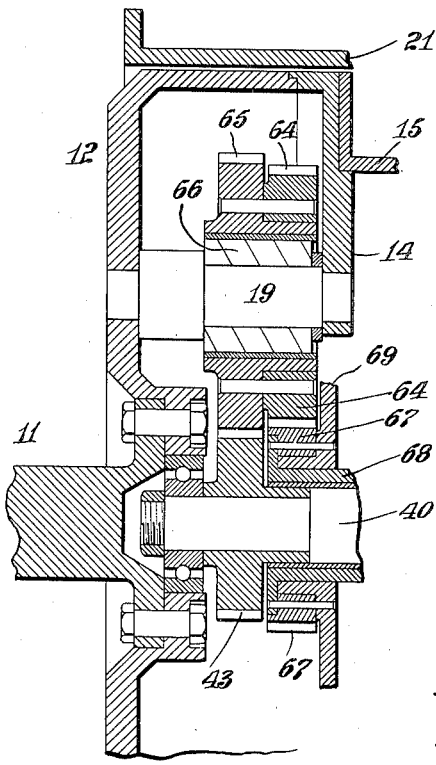
Fig. 5 is a central section taken on the radius 5 of Fig. 4.

Describing first the driving parts, the engine shaft 11 is shown as carrying a disk or revolving support 12 which is extended into a cylindrical shell 13 enclosing the centrifugal masses and operating means to be described. An annular plate or disk 14 is attached to the rear of the shell 13, and a cover 15, revolving with these parts, is attached upon the plate 14, with attaching bolts passing through parts 13, 14 and 15. The main disk 12 and the annular disk 14 face each other and cooperatively carry a number of studs supporting various planetating parts. Thus as seen in Figs. 1 and 4 an oppositely arranged pair of studs 17 give support to planetating parts comprising attached masses; a pair of studs 18 carry planetating parts with cooperating loose masses; and as seen in Figs. 4 and 5 a pair of opposite studs 19 carry intermediate planetary gears for transmitting motion. The described elements 11 to 19 revolve rigidly together and having substantial weight and diameter they afford the fly wheel effect essential with the use of internal combustion engines.

It will be convenient next to describe the fixed outer enclosing elements shown in the drawings. A cylindrical casing 21 may be considered the transmission casing, and encloses the driving parts among others. The casing 21 at its rear is extended preferably as a conical wall 22 to accommodate the revolving interior cover 15. This conical portion is enlarged at 23 to accommodate the external control connections to be described. At its inner rear portion the main casing is formed with a central boss or hub 24, within which is mounted a double flanged sleeve 25. Inside the sleeve piece 25 is a ball bearing 26 interposed between the sleeve and the rotary parts within. Passing from Fig. 1 to Fig. 2 a cylindrical casing 28 having a spherical extension 29 is shown attached to the rear of the sleeve member 25, and enclosing the universal joint to be described. An interior spherical shell 30 engages the fixed shell 29 and permits universal adjustment, the part 30 being extended rearwardly as a cylindrical sleeve 31. Connected to the sleeve 31 is an elongated sleeve or tube 33 constituting the housing for the interior propelling means. This housing 33 at its rear end is connected with a tubular extension 34 flared toward the rear and flanged for connection to a part of the casing 35 which encloses the rear end gears.

It will be convenient, before describing the centrifugal transmitting devices, to describe the various driven parts, including an intermediate propeller shaft, which is preferably controlled by a one-way device or pawl and ratchet, preventing it turning in the wrong direction, followed by a propeller spring for transmitting torque to the driven shaft and wheel axles at the rear. It is proposed to use the underlying principles of the present invention without introducing a transmitting spring, but for purposes of insuring steadiness of drive of the eventual driven shaft the invention herein is shown embodied in connection with a one-way device and transmitting spring. The propeller shaft therefore to which the centrifugal devices immediately transmit torque may be considered as either an intermediate shaft, followed by a propeller spring, or as a driven shaft.

Figure 2:
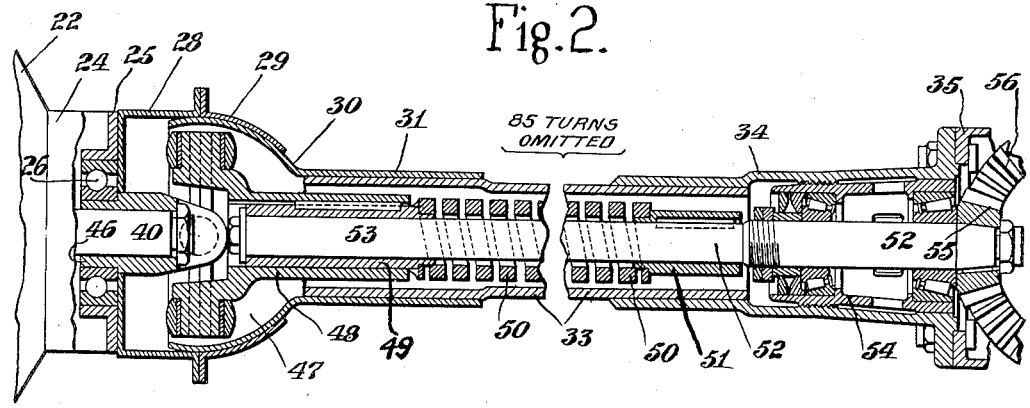
Fig. 2 is a view corresponding with Fig. 1 and substantially a continuation thereof, extending from the transmission casing rearwardly substantially to the rear wheel axle.

The intermediate or propeller shaft 40 is shown arranged in axial alinement with the driving shaft 11. At its left end the shaft 40 is provided with a confining nut 41 and to the right of that a ball bearing 42, then a central gear 43, splined to the shaft, and confined against a shoulder 44. The shaft has a second shoulder 45 further to the right, against which are confined certain parts including a sleeve 46 which gives support to one set of pivots of a universal joint or flexible connection 47, the other set of pivots of which are mounted on a sleeve 48, as seen in Fig. 2. An interior sleeve 49 is splined to the sleeve 48 to permit longitudinal play, and directly attached to the sleeve 49 is an elongated helical propeller spring 50. The drawing is broken away and while only a few convolutions are shown it will be understood that the propeller spring is prolonged and may contain from 90 to 95 convolutions more or less, permitting the spring to be made of substantial cross section and strength, for transmitting purposes, while insuring sufficient yield or strain to prevent the driven parts overrunning the spring and intermediate parts. The rear terminus of the spring 50 is secured to a sleeve 51 keyed to a driven shaft 52, which may be extended forwardly at 53 for the purpose of preserving alinement, while permitting longitudinal and other play. The enlarged rear end of the driven shaft turns in a set of roller bearings in a bearing box 54 secured in the flaring portion of the housing 34. The driven shaft at its rear end may carry the usual bevel pinion 55 meshing with a bevel gear 56 which may carry the usual differential and drive the rear wheel axles.

As already indicated this invention involves, in combination, cooperating centrifugal mass transmission devices of two types, first the type in which the mass as an entity is attached to its planetary carrier or other actuating device, so as to retain permanent operative connection throughout definite movements in both phases, and second the type in which the mass is free or loose, for example of a flowing character, coacting with the carrier or thrusting device only in the inward movement or phase, being then released on discharge to find its way outwardly. The first mentioned type is herein represented by two complete units, mounted on the cross studs 17 already mentioned. Each of the centrifugal masses 60 may be a segment, composed for example of steel, and is shown mounted on a planetary sleeve 61 surrounding the stud 17, with a roller bearing 62 interposed. Each of the sleeves 61 carries also a planet gear 63. The element 60—63, being rigidly attached, may be considered as an entity. The means for actuating or planetating these elements comprises a pair of opposite idler gears 64, meshing with the gears 63 as seen in Fig. 4. As seen in Figs. 4 and 5, a second idler gear 65, slightly larger than the gear 64 is attached alongside each of the latter, and these united gears are mounted on the studs 19, with roller bearings 66 interposed. The two opposite gears 65 mesh with the central gear 43 which is keyed to the propeller shaft 40. By this arrangement when the shaft 40 is held stationary or allowed to move slower than the driving shaft planetary motions are transmitted so as to compel the masses 60 to move inwardly and outwardly in their planetary paths. The interposition of the idler gears causes the masses to planetate in a direction the opposite to the revolution of the fly wheel, as indicated by the arrows in Fig. 4, giving a decided advantage in driving efficiency.

Figure 3:
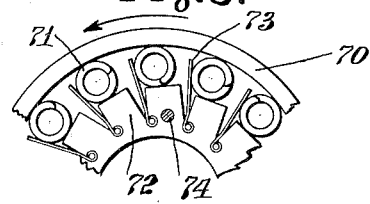
Fig. 3 is a transverse section taken on the line 3—3 of Fig. 1, looking from the rear.

As already explained, in the phase when the mass, or its center of gravity, is being drawn inwardly, the centrifugal force is being transmitted as driving torque to the propeller shaft, but when the mass passes into the second phase and moves outwardly, expedited by centrifugal force, an expedient is necessary to prevent thrust in the wrong direction on the propeller shaft. Certain connections, including a one-way device for this purpose, will now be described. As seen in Figs. 1, 4 and 5, in addition to the central gear 43 engaging the larger planetary gear 65, there is a larger central gear 67 engaging the smaller planetary gear 64. This arrangement of gear proportions is for the purpose of affording an advantageous reverse drive, as will be later explained. The larger central gear 67 is permanently pinned to the flange of a sleeve 68 turning loosely on the shaft 40. There is also pinned to these elements a disk member 69, the periphery of which is formed into a rim 70 forming part of a one-way device in the nature of a pawl and ratchet. As shown in Figs. 1 and 3 the rim 70 is one of the members used for wedging a series of rolling pawls or wedging rollers 71, located inside the wedging rim 70, and at their inner sides contacting against wedging abutments 72, having inclined faces permitting a powerful wedging and gripping, when it is endeavored to turn the rim 70 relatively in one direction, namely clockwise in Fig. 3, so as to prevent rotation, while freely permitting rotation in the other or forward direction. Each roller is provided with a guard spring 73 pressing it into wedging position and preventing its dislodgment. The abutment ring 72 is shown attached by bolts 74 to an anchoring disk 75, which in turn is attached by bolts 76 to a rear anchor disk 77, which is concave to leave space between the disks to receive certain parts to be described having to do with the reversing of the drive. The rear anchor disk 77 extends inwardly to where it is formed into a hub or sleeve 78 extending rearwardly and there secured fixedly against rotation by attachment to the flange member 25, or otherwise held. The anchor disk 77 is located closely within the rotating fly wheel cover 15, while the flange 78 extends under the cover to an exterior point, and the corner between the two may be provided with a packing strip 79 to prevent outflow of oil, or ingress of grit.

The mechanism thus far described comprises the planetating masses 60 which, in their inward movement or phase, apply their centrifugal force as thrusting torque on the propeller shaft 40, which in turn impresses tension or strain upon the propeller spring, from which the vehicle wheels steadily derive driving power, while in the return or outward phase of the masses their centrifugal force, operating reversely, is checked by the silent or friction pawl and ratchet device 70, 71, 72, which operates to allow the masses to travel smoothly outward under control to where they will be ready for another inward thrusting action.

The cooperating loose or flowing masses 80 may be of various forms, but preferably consist of a heavy and freely flowing material. For this purpose there are certain advantages in employing a heavy sand, but this has not the density and mass of mercury, and it is found that a mixture of sand and mercury gives an advantageous centrifugal mass for the purposes of this invention. Each of the masses 80 may be variously combined with its actuating or thrusting device, within the broad principles already stated, but herein specifically is shown an operation analogous to that disclosed in our prior Patent, Number 1,551,692. The mass 80 is shown loosely confined in an annular chamber or channel 81 formed in a planetary carrier or thrusting device 82. Within the channel 81 is shown an abutment or vane 83, which constitutes the actual thrusting element, pressing inwardly on the mass guided annularly by the channel 81. A cover plate 84 is sealed in place so that the flowing mass can not escape. Like the masses 60, the masses 80 are preferably planetated in a direction the opposite to revolution of the fly wheel, as indicated by the arrows in Fig. 4. A dotted line shows that the amount of mass may be such as almost to fill half of the annular channel. In the position in which the parts stand in Fig. 4 the abutment 83 is in the act of forcing inwardly the mass, the center of gravity of which is almost at mid-position. The abutment therefore has been acting upon the mass for nearly a quarter turn, and it will continue to act for nearly a half turn further, until all of the mass is released at the inner dead center to pass outwardly at the opposite side of the channel and there remain until the abutment comes around for a repetition of the thrusting action.

The mountings and planetating connections for the carriers 82 may be as follows. Each carrier is provided with a hub or sleeve 85 surrounding one of the studs 18, with a roller bearing 86 interposed. A planet gear 87 is keyed to each sleeve 85, and these gears are in mesh with the idler gears 64 already referred to, so that the carrier gears 87 are planetated in unison with the gears 63 to which the masses 60 are attached. Of course the transmitting systems or units including the carriers 82 and flowing masses, operating in one direction only, do not require a one-way device or pawl and ratchet to rectify their action, as do the centrifugal masses 60, but it is convenient to have both kinds of units operating through the same set of connections.

As specifically shown in Fig. 4 both of the transmitting units, of both types, are operating simultaneously. The attached masses 60 have started their inward phase slightly ahead of the loose masses 80, and when the attached masses have passed their inward dead center and entered their second phase the loose masses, or so much of them as has not been discharged, will continue to give transmitting effect for a substantial further degree of rotation. In each cycle therefore the period of transmitting effect is substantially of greater extent than would be the case with the attached masses 60 alone, whereas the use of the attached masses conserves power namely by throwing it back into the fly wheel, as these masses return outwardly.

The two carriers 82 are shown planetating in unison, with the flowing masses 80 working in corresponding phases, but with masses of suitably great power the two devices could be arranged to operate in succession, to give overlapping transmitting action, or on the other hand each of the carriers could be formed with a plurality of guides or channels, and a plurality of separate masses, operating in succession to give overlapping action as described in Patent 1,551,692, and thus render the transmission continuous.

Figure 6:
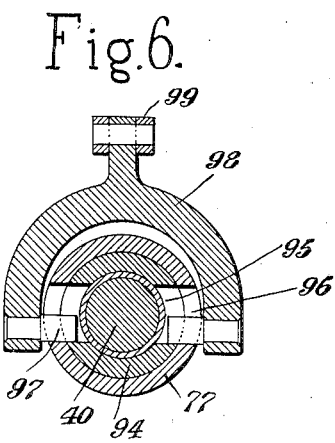
Fig. 6 is a transverse section taken on the line 6—6 of Fig. 1.

An advantageous means of reversing the direction of drive is indicated in Figs. 1 and 6. In prior mechanisms of this general type it has been deemed necessary to release or render inoperative the pawl and ratchet or one-way device which controls the action when driving forwardly in order to enable the direction of drive to be reversed. This is herein accomplished without the need of releasing the pawl and ratchet, and is shown accomplished by the mere braking or anchoring of a central gear, for example the central gear 67 already referred to. By considering Figs. 1 and 4 it will be understood that when gear 67 is anchored this will operate through gears 64 and 65 to turn the central gear 43 in reverse direction at slow speed. This positive gear arrangement prevails and the centrifugal masses are of no operative effect.

The means for braking or anchoring the central gear 67 to impose reverse drive may be as follows. A thin brake disk 90 is shown keyed to the rear end of the sleeve 68 which carries the gear 67. This friction disk is located within the space between the front and rear anchor disks 75 and 77. A shiftable pressure disk 91 is also accommodated in the same space. Friction facings 92 are shown applied to the disks 75 and 91, to give braking friction upon the friction disk 90. The pressure disk 91 is arranged to shift axially in a forward direction to apply the desired braking pressure. In such movement, and to prevent its rotation, it is shown guided by studs 93 passing through disks 76 and 91. The pressure disk 91 extends inwardly substantially to the propeller shaft and is there formed into a hub or sleeve 94 extending rearward to an exterior point. It is only necessary to shift the sleeve 94 relatively forward to apply the braking action upon the disk 90 to anchor the gear 67.

This may be done by a pair of relatively inclined cams, namely slot 95 in the sleeve 94 and slot 96 in the sleeve 78 of the anchor disk 76. A pair of opposite cam studs 97 extend through both slots at both sides, as seen in Fig. 6. These cam studs are carried at the lower end of a forked link 98 which extends upwardly and is pivoted to a rock arm 99 which in turn is keyed to a rock shaft 100, which may be manually controlled in any manner, for example as indicated by exterior lever 101, which may stand at position $f$ for forward drive, as shown, or be shifted to position $r$ for reverse drive. When the lever is shifted from $f$ to $r$ the cam studs 97 are lifted, and thus the pressure disk 91 is thrust forwardly to squeeze the brake disk 90 and thus anchor it and the central gear 67. By this means the direction of drive is reversed in a very simple manner, delivering effective drive at low ratio, as is desirable for motor vehicles.

One way to consider the reversible drive is that the one-way device elements, the rim 70 and abutment disk 72, with rolls 71 between, act during forward drive like a pawl and ratchet, one of the elements, preferably 72, being substantially stationary, and the other element 70 turning only forwardly, so that the gear 67 will turn forwardly in the inward phase of the masses but remain stationary in the outward phase. When the planetating parts are thus turning gear 67 forwardly they are likewise turning gear 43 and the propeller shaft 40 forwardly; but when the gear 67 is stationary, in the outward phase, the gear 43 will be held against free backward rotation, although permitted to turn back and unwind the propeller spring a small amount, due to the gearing ratios, which however is negligible. When readjusted for reverse drive, however, the element 70 is held not merely against reverse rotation, but against all rotation, so that gear 67 becomes fixed, and cooperating with gears 64, 65 and 43 compels continuous slow reverse drive of shaft 40 and the driven parts beyond.

Figure 7:
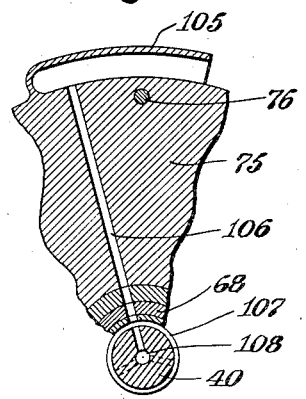
Fig. 7 is a transverse section taken on the line 7—7 of Fig. 1, looking from the rear.

An advantageous and convenient mode of lubricating is indicated in Figs. 1 and 7. The body of oil revolving rapidly in the space within the cover 15 is caused to enter a scoop 105 arranged at the upper part of the anchor disk 75. The pressure of the oil thus flowing forcibly into the scoop causes it to pass radially down the interior passage 106 to the shaft 40 wherein it may be conveyed by internal passages 107 to various points along the length of the shaft.

In referring herein to the abutment member 72 of the one-way device as being stationary, and in referring to the intermediate rotary part 67, 68, 69, 70 as being held stationary at certain times, or as being anchored, it is not intended to exclude controlled slow or unsubstantial movements, as manifestly the abutment member, while holding or anchoring the rotary part, may itself be slowly turned, as by gearing from the driving member, and in either direction, without interfering with the transmission; and likewise when it is said that the one-way device prevents reverse rotation of the propeller shaft, it is intended that free or substantial reverse rotation is prevented in the one phase while forward rotation is freely permitted in the other phase.

It will thus be seen that there has been described a power transmission apparatus embodying the principles and attaining the advantages of the present invention; and since many matters of combination, arrangement, operation, mechanism and detail may be variously modified without departing from the principles, it is not intended to limit the invention to such matters except so far as set forth in the appended claims.

What is claimed is:

1. Power transmission apparatus comprising the rotary driving member, a revoluble support turned by the driving member, and a rotary propeller member, in combination with a plurality of transmitting means between the driving and propeller members, one consisting of a mass arranged on said support to be revolved bodily while planetated inwardly and outwardly, and connections including a planetary gear between the propeller member and the mass for alternately compelling the mass to move inwardly and allowing it to return outwardly, and the other consisting of a planetary carrier on the support and a loose mass cooperating therewith, the carrier adapted to thrust the mass inwardly and release it to return outwardly, and connections from said planetary gear to the carrier for actuating it, and a one-way device preventing the propeller shaft rotating in the wrong direction.

2. Power transmission apparatus comprising the rotary driving member, a revoluble support turned by the driving member, and a rotary driven member, in combination with a transmitting means between the driving and driven members, consisting of a mass arranged on said support to be revolved bodily while movable inwardly and outwardly, and connections from the driven member to the mass for alternately compelling the mass to move inwardly and allowing it to return outwardly, a rotary part concentric with the driven member, a one-way device preventing the said part rotating in the wrong direction, a gear train between said part and driven member such that the one-way device holds said part against wrong rotation, and means cooperating with the one-way device for holding such part against rotation in either direction whereby the driven member is driven reversely at low speed through said gear train.

3. Power transmission apparatus comprising a driving member (as 11 or 12) a centrifugal mass (as 60) revolved thereby, a planet gear (as 63) attached to said mass, a second planet gear (as 64) meshing with said first planet gear, a third planet gear (as 65) larger than and turning with said second planet gear, a central gear (as 43) meshing with said third planet gear, a shaft (as 40) turning with said central gear, a second central gear (as 67) larger than said first central gear and meshing with said second planet gear, a one-way device (as 70, 71, 72) normally allowing said second central gear to turn freely forwardly but not reversely, and reversing connections for holding said second central gear against free forward or reverse movement, whereby said driving member acting through said planet and central gears effects reverse drive of said shaft.

4. Apparatus as in claim 3 and wherein is a pedal or lever operable at will, a friction clutch cooperating with said one-way device, and connections from the lever to the clutch for applying the clutch to anchor the one-way device and said second central gear.

5. Power transmission apparatus comprising a rotary driving member, a rotary propeller member, and a rotary part (as 67, 68, 69, 70) intermediate the two, in combination with a centrifugal mass, a one-way device cooperating with the intermediate part permitting only forward direction of rotation, a reversing differential gear train between the centrifugal mass and the intermediate part and the propeller member, adapted to cause the mass to move inwardly and outwardly to impress alternating torque on the intermediate part and such that when the intermediate part is rendered stationary the propeller member will be driven in a reverse direction, and means for rendering the intermediate member stationary to produce such reversal of drive.

6. Power transmission apparatus comprising a rotary driving member, a rotary propeller member, and a rotary part (as 67, 68, 69, 70) intermediate the two, in combination with a centrifugal mass, a one-way device cooperating with the intermediate part permitting only forward direction of rotation, a reversing differential gear train between the centrifugal mass and the intermediate part and the propeller member, adapted to cause the mass to move inwardly and outwardly to impress alternating torque on the intermediate part and such that when the intermediate part rotates the propeller member rotates with it, but when the intermediate part is rendered stationary the propeller member will be driven in a reverse direction, and means for rendering the intermediate member stationary to produce such reversal of drive.

7. Power transmission apparatus comprising a driving member, a driven member, in combination with a transmitting device operated by the driving member and containing a centrifugal means movable inwardly and outwardly for delivering pulsating or intermittent torque, connections including a one-way device extending between the centrifugal means and the driven member, adapted to cause the centrifugal means to move inwardly and outwardly and normally transmitting forward one-way torque to the driven member, and a reversing differential gear train adapted to be put into operation at will for changing said connections to deliver a continuous, positive and slow one-way torque in a reverse direction to the driven member.

8. Power transmission apparatus comprising the rotary driving member, a revoluble support turned by the driving member, and a rotary propeller member, in combination with a plurality of transmitting means between the driving and propeller members, one consisting of a mass arranged on said support to be revolved bodily while movable inwardly and outwardly, and connections from the propeller member to the mass for alternately compelling the mass to move inwardly and allowing it to return outwardly, and the other consisting of a movable device on the support and a loose mass cooperating therewith, the device adapted to thrust the mass inwardly and release it to return outwardly, and connections from the propeller member to the movable device for actuating it, a one-way device arranged for preventing the propeller shaft rotating in the wrong direction, a rotary part concentric with the propeller member, and upon which part the one-way device acts, a reversing differential gear train connecting the said rotary part and propeller member, and means for at will holding said part against forward rotation and thereby putting into effect the gearing to cause the reverse rotation of the propeller member.

In testimony whereof we have affixed our signatures hereto.

JOHN REECE.
FRANKLIN A. REECE.